Patented Apr. 16, 1946

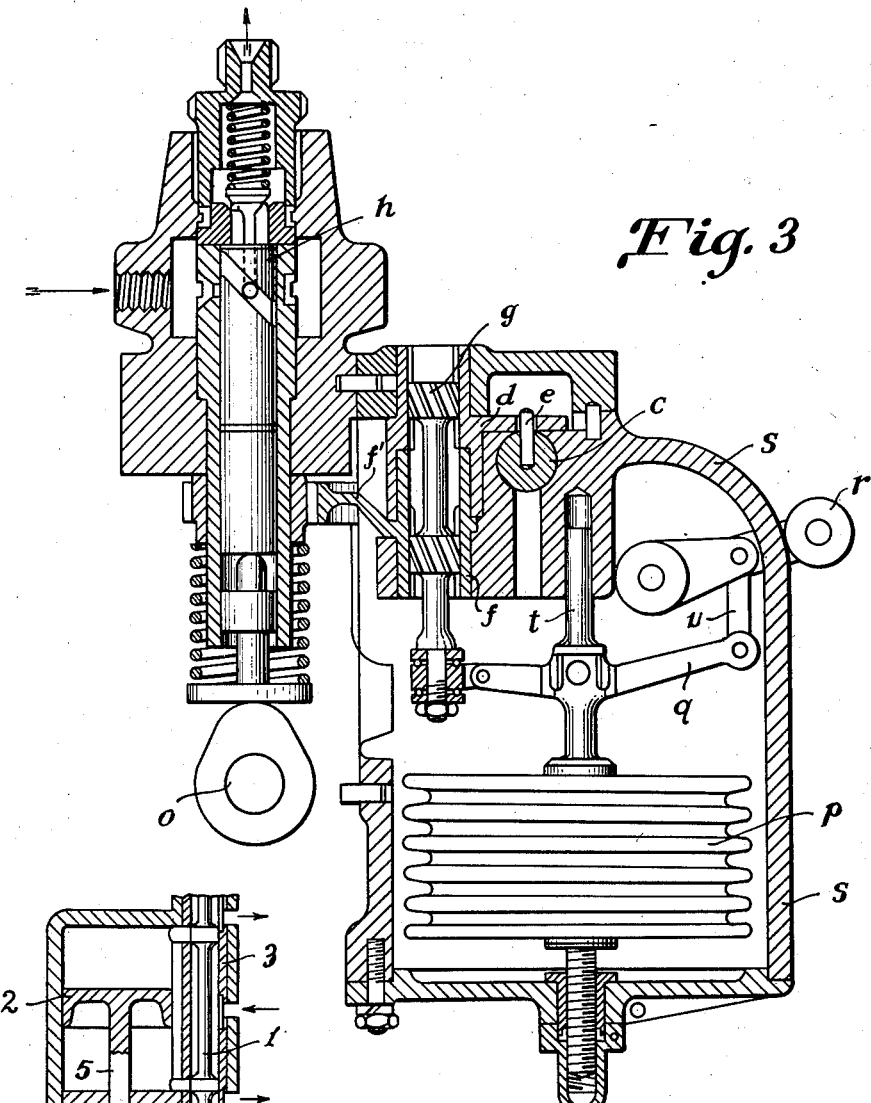
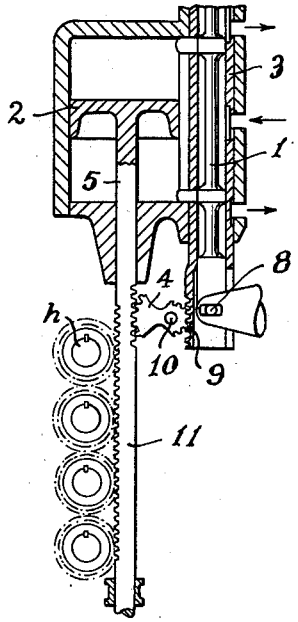

2,398,460

UNITED STATES PATENT OFFICE 2,398,460

MECHANISM FOR REGULATING PUMPS FOR INTERNAL-COMBUSTION ENGINES

Wifredo Ricart, Barcelona, Spain

Application August 24, 1943, Serial No. 499,853
In Spain August 25, 1942

6 Claims. (Cl. 123—140)

The present invention relates to a feed regulator for fuel injector pumps for internal combustion engines, the action of the regulator being dependent upon two distinct regulating devices.

The principal regulating device acts, in accordance with the air supply pressure and by means of suitable mechanism, on the feed member which, in this case, is constituted by the plunger of an injector pump, but which may be of any other convenient type.

The second regulating device includes two correcting elements, one of which is influenced by the temperature of the air feed, while the other is influenced by variations in barometric pressure.

Both of these devices act on the aforementioned pump plunger in order to vary the amount of fuel for the purpose of feeding it with greater exactitude in correspondence with the density of the air drawn in by the engine.

All the elements mentioned above may act separately or simultaneously, according to the variations of the respective physical conditions of the surrounding atmosphere in which they operate and to which each of them is subjected.

It is an object of the regulator, which constitutes the subject of this invention, to avoid having to stop the engine in case of any accident to the barometric capsule, as is necessary when the latter acts as the sole feed regulator for the carbureter or when all the forces necessary for the feed regulation—which, as already stated is carried out in connection with the feed pressure—originate from the said capsule. In such case, the barometric capsule is liable to be damaged due to the fact that a regulator of the character described requires frequent and appreciable axial displacements, being subjected to strong vibrations; on the other hand, when using the capsule according to the present invention its work is limited solely to a corrective action in correspondence with the barometric pressure and the corrective variations are effected very slowly.

On the accompanying sheets of drawings and by way of non-limitative example, there are shown preferred embodiments of the invention.

Fig. 3 is a view taken along line 3—3 of Fig. 1.

Fig. 4 is a fragmentary view, partly in section, of an automatically controlled hydraulic device for the simultaneous regulation of a plurality of feeding elements.

Figure 1:
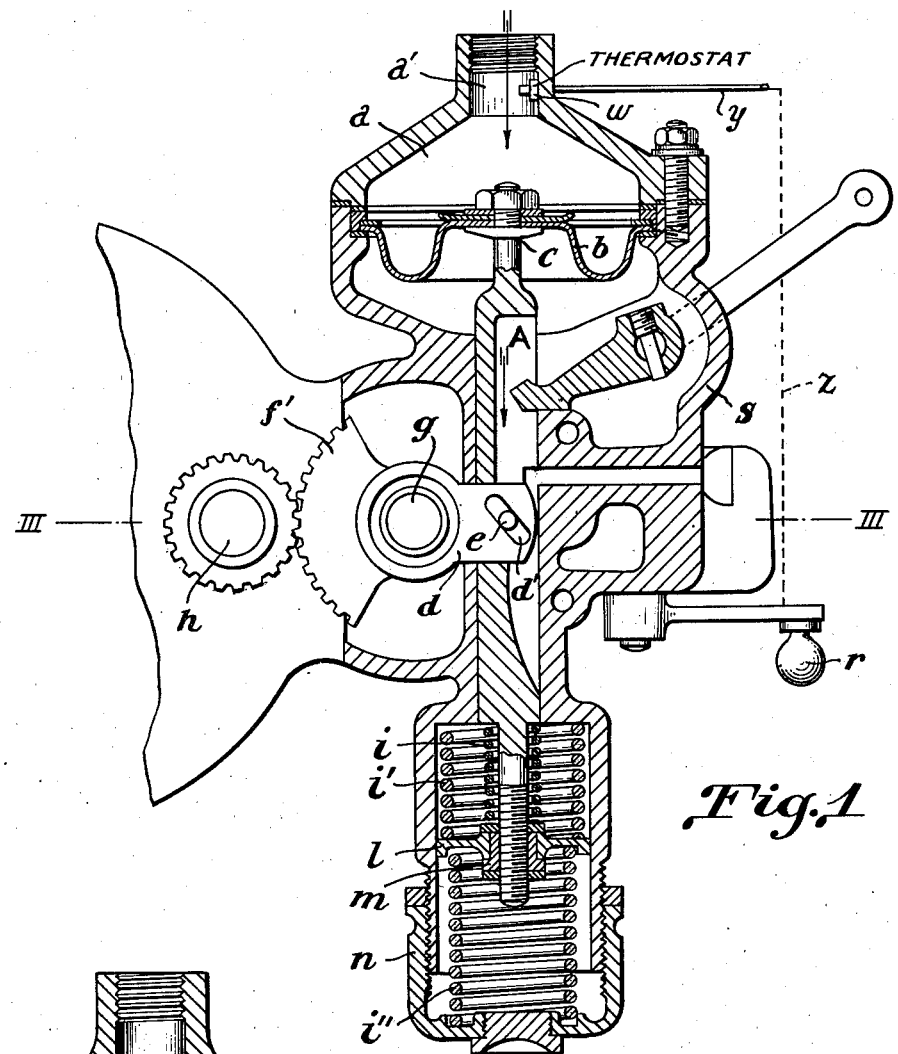
Fig. 1 is a view, partly in longitudinal section, showing the arrangement of the regulator according to this invention.

On the said drawings, reference character $a$ designates an air chamber connected to the feed conduit $a'$, $b$ designates a diaphragm connected in any suitable manner to a control stem $c$ provided with a bolt $e$ which slides in the apertures $d'$ of an extension of a rotary sleeve element $d$. The shaft $g$ which couples the two rotary sleeve elements $d$ and $f$ (Fig. 3), rotatably mounted on cover $s$, is provided with two helicoidal gear elements, or at least one cylindrical and one helicoidal gear, by means of which the two sleeve elements $d$ and $f$ are caused to rotate. The said shaft $g$ is connected, in a manner to allow rotation thereof, to one end of lever $q$ which forms part of the stem $t$ fixed to the barometric capsule $p$, while the other end of the said lever is connected kinematically to the lever $r$. This connection is realized by means of a member $u$ suitably connected to the lever $r$ at a point located intermediate the ends of the latter. One end of the said lever $r$ rotates on the wall of the cover $s$, while the other end is connected, in any suitable and desirable conventional manner (represented diagrammatically at $z$), to the extensible element $y$ of a thermostat $w$ mounted in the air feed conduit.

The toothed segment $f'$ of the element $f$ engages the toothed crown of the fuel feed element $h$ (Fig. 3).

The arrangement according to the invention operates as follows:

The air feed conduit $a'$ opens into the chamber $a$ and, consequently, the feed pressure prevailing in the said feed conduit acts freely on the diaphragm $b$ arranged in the chamber $a$. This diaphragm is suitably connected to stem $c$ in such manner that the air feed pressure which produces the deformation of the diaphragm $b$ thereby also produces a longitudinal displacement of the stem $c$. The other end of the said stem is provided with a regulating screw $m$ on which there rests the plate $l$ which is maintained in correct position by spring $i$. One end of the spiral spring means $i'$ bears against this plate $l$, the other end of said spring means $i'$ bearing against the cover $s$, this arrangement counteracting the depression produced in the chamber $a$ during the suction strokes of the engine. Bearing against the underside of the plate $l$ is one end of helical spring means $i''$, the other end of which bears against the cap or regulating cover $n$, through the medium of which the load of the said opposing spring means $i'$ and $i''$ may be regulated.

As previously stated, the stem $c$ carries a pin or lug $e$ which extends into a slot $d'$ of the rear extension of the rotary member $d$. By increasing the pressure in the feed conduit and consequently in the chamber $a$, the diaphragm $b$ is deformed and pushes the stem $c$ in the direction of arrow A. The pin $e$ fixed to the said stem, on sliding in the slot $d'$, rotates the element $d$. This element is provided internally with a toothed section in which there meshes the top toothed crown of the coupling shaft $g$, the lower helicoidal toothed crown of which, in turn, meshes with the toothed internal crown of the element $f$ mounted for rotation in the cover $s$ and provided with a toothed segment $f'$.

As is shown in Fig. 3, one end of the coupling shaft $g$ is connected to one end of the balance beam $q$, connected in turn to the link $t$ and to the barometric capsule $p$.

As a result of this relationship of the parts, rotary displacement of the toothed segment $f'$ is influenced, on the one hand, by the pressure existing in the feed tube, as hereinbefore described, thereby causing through the medium of element $d$ the rotation of coupling shaft $g$ and consequently also of the element $f$ which carries the segment $f'$, thus regulating the feed element $h$ of the pump; on the other hand, the displacement of the toothed segment $f'$ is also influenced by the barometric pressure which, allowing the expansion or contraction of the barometric capsule $p$, effects displacement in one direction or the other of the coupling shaft $g$, which, by means of its toothed crowns (one of which at least is helicoidal) reciprocally displaces the two elements $d$ and $f$, thus influencing the position of the segment $f'$.

The position of the said shaft $g$ is corrected in addition with relation to the temperature of the feed air, by means of a thermostat mounted in said air feed conduit. The extensible portion of this thermostat is connected with the lever $r$ which, by means of a suitable kinematic connection through link $t$ with the balance beam $q$ fixed on the barometric capsule $p$, limits the latter's extent of expansion and consequently the axial displacement of the shaft $g$, thus influencing the segment $f'$ which regulates the piston element $h$.

Figure 2:
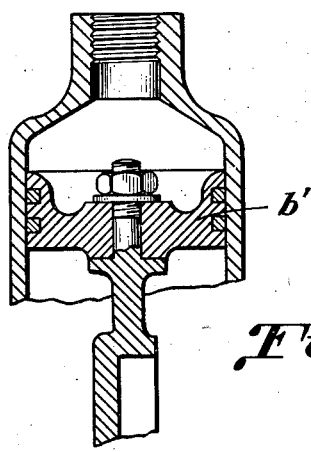
Fig. 2 shows a variation in the construction of a detail of Fig. 1.

Fig. 2 shows a modification of the regulator construction according to the invention, wherein the diaphragm $b$ is replaced by a piston $b'$ with identical functions.

Fig. 4 shows the application of an automatic hydraulic arrangement for simultaneously regulating a plurality of feed elements $h$ of an injector pump. The toothed segment $f'$ is eliminated and is replaced by a bolt 8 which, by means of a suitable connection, controls the distributing piston 1 of a conventional automatic control mechanism with a sliding jacket 3, the extended portion of which is provided with a rack 9. In meshing engagement with this rack is a member 4 mounted in axle 10. The said member 4 is a double segment whose point of rotation is so selected that it corresponds to the desired relation between the displacement of the movable jacket 3 and consequently of the rack 9 and that of the stem 5 of the control piston 2. This stem 5 is in turn provided with rack 11 which meshes with the toothed crowns of the several feed elements $h$ of the injector pump.

It will be understod that details of the described construction may undergo minor modifications without departing from the spirit and scope of the invention.

I claim:

1. Mechanism for controlling the fuel supply of a fuel injector pump of an internal combustion engine, comprising means for automatically regulating such supply in response to pressure variations in the air inlet conduit of the said engine, means for compensating said fuel supply in accordance with variations in the temperature of the air in said conduit, and means for compensating said fuel supply in accordance with the barometric pressure of the outer atmosphere, said regulating means including a rotatable member and means actuated by the pressure in said air inlet conduit for actuating the said rotatable member, a second rotatable member coaxial with said first-mentioned rotatable member and operatively connected to said fuel injector pump, and means interconnecting said rotatable members with said compensating means, respectively, and comprising a coupling member extending between said rotatable members and transmitting rotary movement from one to the other thereof, said coupling member being mounted for sliding movement relative to said rotatable members, and means for effecting sliding movement of said coupling member.

2. Mechanism for controlling the fuel supply of a fuel injector pump of an internal combustion engine, comprising means for automatically regulating such supply in response to pressure variations in the air inlet conduit of the said engine, means for compensating said fuel supply in accordance with variations in the temperature of the air in said conduit, and means for compensating said fuel supply in accordance with the barometric pressure of the outer atmosphere, said regulating means including a diaphragm having a surface exposed to the pressure variations in the said air inlet conduit and a sliding stem connected at one end to said diaphragm, a rotatable member having an arcuately-slotted extension, and a pin on said stem extending into said arcuate slot whereby displacement of the diaphragm causes a corresponding rotary movement of said rotating member, a second rotatable member coaxial with said first-named rotatable member and having an extension in the form of a toothed segment thereon, toothed means on said fuel injector pump coacting with said segment whereby movement of said second rotatable member is transmitted to said pump, and means interconnecting said rotatable members with said compensating means, respectively and comprising a coupling member extending between said rotatable members and transmitting rotary movement from one to the other thereof, said coupling member being mounted for sliding movement relative to said rotatable members, and means for effecting sliding movement of said coupling member.

3. Mechanism for automatically regulating the fuel supply of a fuel injector pump of an internal combustion engine in response to pressure variations in the air inlet conduit of the said engine, which comprises means exposed to the said pressure variations and displaceable in accordance therewith, and means on said injector pump adjustably movable to control the quantity of fuel injected thereby; and means for transmitting movement of said first-named means to said second named means and comprising a rotatable cylindrical member operatively connected to said first-named means and movable therewith, a second rotatable cylindrical member operatively connected to said injector pump means and movable therewith, said cylindrical members being coaxially juxtaposed, and coupling means arranged within said cylindrical members and slidably extending therebetween and being in toothed engagement therewith, whereby movement of one said cylindrical member is transmitted through said coupling means to the other cylindrical member, and means for effecting sliding movement of said coupling means.

4. Mechanism for automatically regulating the fuel supply of a fuel injector pump of an internal combustion engine in response to pressure variations in the air inlet conduit of the said engine, which comprises means exposed to the said pressure variations and displaceable in accordance therewith, and means on said injector pump movable to control the quantity of fuel injected thereby; means for transmitting movement of said first-named means to said second-named means and comprising a rotatable cylindrical member operatively connected to said first-named means and movable therewith, a second rotatable cylindrical member operatively connected to said injector pump means and movable therewith, said cylindrical members being coaxially juxtaposed, and coupling means slidably arranged within said cylindrical members and extending therebetween and being in toothed engagement therewith whereby movement of one said cylindrical member is transmitted through said coupling means to the other cylindrical member, said toothed engagement with at least one of said cylindrical members being helical in character whereby relative sliding movement of said coupling means causes rotation of said one of said cylindrical members; and means for effecting sliding movement of said coupling means.

5. The relationship of parts defined in claim 2, said sliding stem having a disk adjustably secured to the other end thereof, spring means acting on said disk, and means for regulating the tension of said spring means to control the effect of the pressure variations in said air inlet on said diaphragm.

6. The relationship of parts defined in claim 1, the operative connection between said second rotatable member and said fuel pump comprising a sliding distributor with a slidable jacket, a hydraulic cylinder governed by said jacket, a piston and piston rod for said cylinder, means interconnecting said piston rod and said fuel pump, means interconnecting said second rotatable member and said jacket, and means correlating the displacement of said jacket with the displacement of said piston rod.

WIFREDO RICART.